United States Patent [19]

Uchida

[11] 4,204,219

[45] May 20, 1980

[54] NOISE CANCELLATION CIRCUIT

[75] Inventor: Tomoaki Uchida, Yokohama, Japan

[73] Assignee: Victor Company of Japan, Limited, Yokohama, Japan

[21] Appl. No.: 932,291

[22] Filed: Aug. 9, 1978

[30] Foreign Application Priority Data

Aug. 12, 1977 [JP] Japan .................................. 52-96629

[51] Int. Cl.² .......................... H04N 5/21; H04N 5/44
[52] U.S. Cl. ..................................... 358/155; 358/157; 358/167
[58] Field of Search .......................... 358/155, 157, 167

[56] References Cited

U.S. PATENT DOCUMENTS 3,700,803  10/1972  Rhee ..................................... 358/155
4,040,090  8/1977  Haynes .................................. 358/155

Primary Examiner—Robert L. Richardson
Attorney, Agent, or Firm—Lowe, King, Price & Becker

[57] ABSTRACT

The peak value of an input signal is detected for comparison with the instantaneous value of the input signal to control the detected peak value at a constant level in a feedback loop. When the instantaneous value of the input signal exceeds a certain limit established relative to the controlled peak level, an offset voltage is generated to cancel the noise.

9 Claims, 4 Drawing Figures

NOISE CANCELLATION CIRCUIT

BACKGROUND OF THE INVENTION

The present invention relates generally to noise cancellation and in particular to a noise cancellation circuit effective in suppressing noise component in the presence of peak-to-peak variations of the signal component. The noise cancellation circuit of the invention is particularly effective in suppressing noise in a composite video signal of television receivers.

A prior art noise cancellation circuit which has been proposed heretofore for television receivers operates on a signal derived from comparison of the instantaneous value of a composite signal with a threshold level. However, the average picture level (APL) of the composite signal may vary from instant to instant so that the peak level of the synchronization signal contained in the composite signal varies accordingly. Because of the variation of APL, the prior noise cancellation is not satisfactory.

SUMMARY OF THE INVENTION

An object of the invention is therefore to provide a noise cancellation circuit which is effective in suppressing noise components of an input signal in the presence of variations of the average picture level of the synchronization signals of television receivers.

According to the invention, the peak value of an input signal is detected and stabilized at a constant level. This stabilization control is accomplished by a feedback loop in which the instantaneous value of the input signal is compared with the detected peak value. When the instantaneous value of the input signal exceeds a preset limit established relative to the constant peak level, the circuit recognizes this as a noise and operates to derive an offset voltage which is combined with a voltage variation resulting from the introduction of the noise.

Specifically, the invention contemplates the use of a negative feedback loop formed by an operational amplifier in a differential amplifier configuration and a peak detector connected through a summation point to the output of the differential amplifier in order to feed its output to a second differential amplifier wherein it is compared with the instantaneous value of an input signal to provide a differential output signal. The feedback signal therefore represents a peak value of the input signal and because of the feedback operation this peak value is maintained at a constant level. A DC voltage is superimposed on the input signal so that the peak level of the latter is slightly above the level of the DC voltage. The invention further includes a second feedback loop formed by a comparator and the peak detector through the summation point. The comparator compares the DC superimposed signal with the peak detector output and operates as a positive feedback loop when the former falls below the latter generating an offset voltage to cancel a voltage which would be developed at the summation point in response to a sudden fluctuation of the input signal level.

BRIEF DESCRIPTION OF THE DRAWINGS

The invention will be further described by way of example with reference to the accompanying drawings, in which.

DETAILED DESCRIPTION

Figure 1:
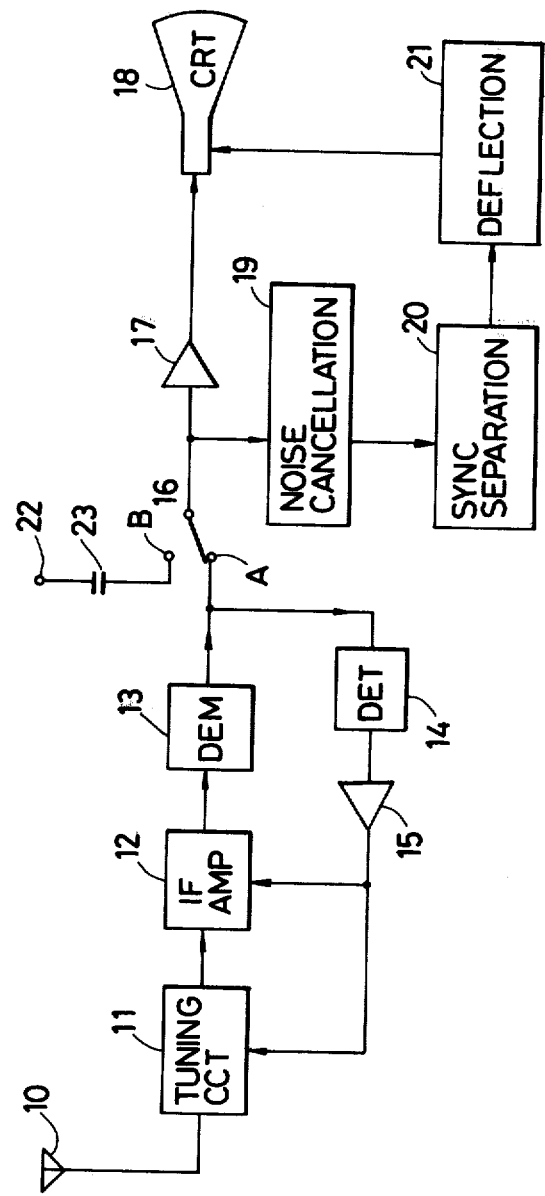
FIG. 1 is a schematic block diagram of a television receiver incorporating a noise cancellation circuit of the invention.

A television receiver embodying the present invention is illustrated in FIG. 1. A television signal transmitted from a broadcast station is intercepted by antenna 10 and fed into a tuning circuit 11 and thence to an intermediate frequency amplifier 12 and to a demodulator 13 to derive a composite video signal. The peak level of the synchronization signal included in the video signal is detected by a peak detector 14, amplified at 15 and supplied to the IF amplifier 12 and to the tuning circuit 11 for the purposes of providing automatic gain control so that the synchronization signal is controlled to have a constant peak level. The operation of all of these circuitry being well known in the art, the description thereof is deemed unnecessary.

The composite video signal is applied through the contact A of a switch 16 to an amplifier 17 and thence to the control electrode of a cathode-ray tube 18 on the one hand, and on the other hand to a noise cancellation circuit 19 constructed according to the invention and thence to a sync separator 20 to separate the vertical and horizontal synchronization signals from the video signal. Deflection circuit 21 generates in the conventional manner vertical and horizontal deflection signals for application to the deflection means of the cathode-ray tube 18.

Through the B contact of switch 16 is applied a local composite video signal from a video tape recorder or a household television camera to the cathode-ray tube instead of the signal from the demodulator 13. Such local signals are fed through terminal 22 and a decoupling capacitor 23 to block the DC component of the local signal. This DC decoupling is for the purposes of adjusting the DC level of the locally generated signal to the DC level of the broadcast signal received at antenna 10, because the locally generated signal has not necessarily the same DC level as that obtained at the output of the demodulator 13.

If the average picture level of the local composite signal varies from instant to instant, the peak level of the synchronization signal may vary from instant to instant through the averaging action of the DC decoupling capacitor 23, so that the satisfactory operation of the sync separator 20 is not ensured.

Figure 2:
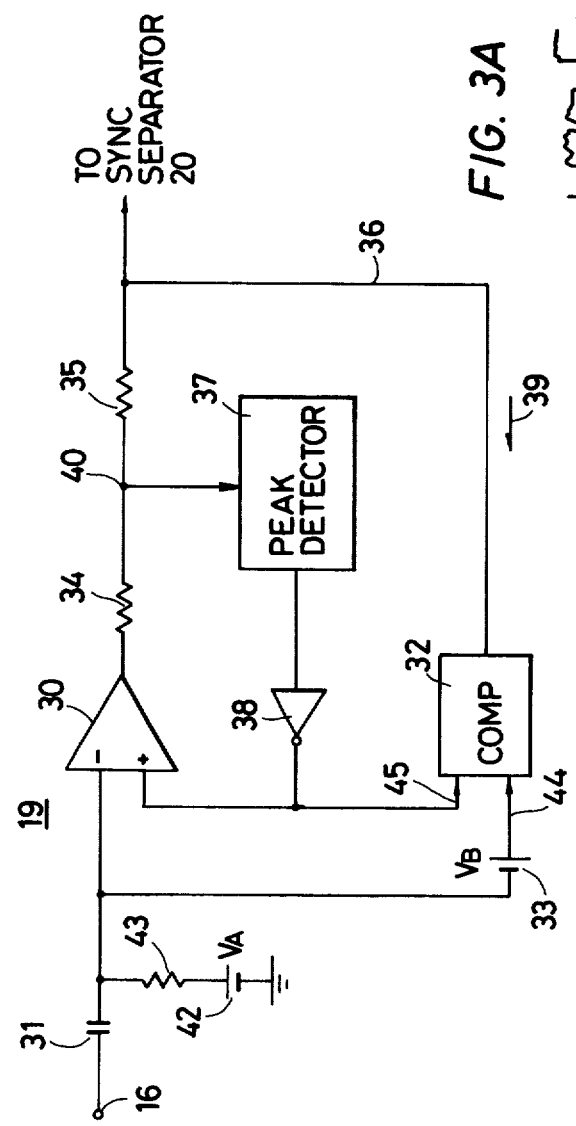
FIG. 2 is a circuit diagram of the noise cancellation circuit of FIG. 1.

FIG. 2 is an illustration of the noise cancellation circuit 19 constructed in accordance with the invention. The noise cancellation circuit 19 comprises an operational amplifier in a differential amplifier configuration 30 having an inverting input terminal connected to receive a DC-decoupled composite video signal from the switch 16 through a capacitor 31 and having a noninverting input terminal connected to the inverting input terminal of a noise detecting comparator 32 whose first input terminal 44 is positively biased with respect to the inverting input terminal of the operational amplifier 30 by a DC bias means 33. The output terminal of the amplifier 30 is connected to the input of the sync separator 20 through resistors 34 and 35 and also connected to the output terminal of the comparator 32 through lead 36. A negative feedback loop is formed by a peak detector 37 connected to a junction or summation point 40 between resistors 34 and 35 to detect the peak value of the synchronization pulse appearing at the junction and an inverter 38 which inverts the detector 37 output and feeds it to the noninverting input terminal of the operational amplifier 30. The output from the inverter 38 is also coupled to a second input terminal 45 of the comparator 32.

Figure 3A:
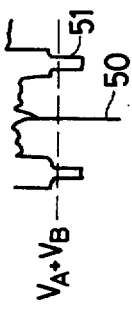
FIG. 3A is a waveform of a composite video signal appearing at the inverting input of an operational amplifier of FIG. 2.

The inverting input terminal of the amplifier 30 is positively biased with respect to ground by means of a DC bias source 42 through a resistor 43 to provide a DC bias potential to the DC-cutoff input signal so that the average DC level of the signal at the inverting input of amplifier 30 is as shown in FIG. 3A. The composite video signal applied to the amplifier 30 is a positive polarity video signal so that its output is a negative polarity video signal, which output signal is passed through the resistors 34 and 35 to the sync separator 20. A voltage developed across the resistor 34 is a positive going synchronization pulse of which the peak value is detected and stored in the peak detector 37. The stored positive going peak value is inverted at 38 and applied to the noninverting input of amplifier 30 as a feedback signal. The amplifier 30 provides a difference signal representative of the difference between the instantaneous value of the input signal and the level of the feedback signal. Because of the negative feedback operation, the magnitude of the difference between the input signals to amplifier 30 is reduced so that the peak value of the synchronization pulses at the output thereof is stabilized at a constant level.

The comparator 32 compares its input signals to deliver an output current which passes through the resistors 34 and 35 and lead 36 in the direction as indicated by the arrow 39 when the voltage at the terminal 44 is lower than the voltage at the terminal 45. There is no output current when the input voltage relation is reversed.

If the negative feedback loop has a sufficient amount of loop gain, the voltages applied to the inverting and noninverting inputs of the amplifier 30 are of substantially equal value. Normally, the voltage at the input terminal 44 of comparator 32 is higher than the voltage at input terminal 45 and hence there is no output current flow through lead 36.

If the input signal rapidly drops below the peak level of the synchronization signal due to introduction of an unwanted signal 50 (FIG. 3A) a positive spike would be produced at the summation point 40. On the other hand, the voltage at the terminal 44 of comparator 32 is reduced to a level below the voltage at the terminal 45, thus producing a current flow in the direction of the arrow 39 which passes through the resistors 34 and 35 to produce an offset voltage at the summation point 40. Therefore, the spike voltage at the summation point 40 due to the noise component is effectively cancelled.

Figure 3B:
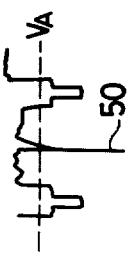
FIG. 3B is a waveform appearing at a first input of comparator of FIG. 2.

Once the comparator 32 has been brought into operation in response to the introduction of noise, a positive feedback loop is formed by the resistor 35, peak detector 37, inverter 38, comparator 32 and output lead 36. However, there is a likelihood of a continuation of the positive feedback operation even though the noise has cleared if the voltage at terminal 45 of comparator 32 is higher than the average DC level of the signal at the terminal 44 (see FIG. 3B). In order to avoid the continuation of the positive feedback operation, the resistors 34 and 35 are chosen such that the stabilized peak level and hence the voltage at terminal 45 is controlled at a level below the combined voltages of $V_A$ plus $V_B$. With this voltage setting, the positive feedback operation will discontinue in response to a subsequent sync pulse 51 (FIG. 3B).

The peak detector 37 should be designed so that its charging time constant value be insufficient to respond to the noise spike voltage but sufficient to respond to the synchronization pulse, and its discharging time constant value be sufficient to maintain a constant value for an interval between successive synchronization pulses.

What is claimed is:

1. A circuit for cancellation of noise in an electrical signal, comprising:
differential amplifier means having a first input terminal receptive of said electrical signal and a second input terminal receptive of a feedback signal applied thereto for generating a first output signal representative of the difference in magnitude between said electrical signal and said feedback signal;
peak detector means connected to be responsive to said first output signal through a summation point for detecting a peak value of said electrical signal to generate a voltage signal representative of the detected peak value, said voltage signal being said feedback signal;
comparator means having a first input terminal connected to be responsive to said electrical signal and a second input terminal connected to be responsive to said feedback signal to provide a second output signal to said peak detector means through said summation point to produce an offset voltage thereat when the voltage at the first input terminal of the comparator is reduced to a level below the voltage at the second input terminal of said comparator; and
biasing means for biasing the first input terminal of said comparator means to a certain potential level with respect to the first input terminal of said differential amplifier means.

2. A noise cancellation circuit for use in separating synchronization pulses from a composite video signal, comprising:
differential amplifier means having a first input terminal receptive of said composite video signal and a second input terminal receptive of a feedback signal applied thereto for generating a first output signal representative of the difference in magnitude between said composite video signal and said feedback signal;
peak detector means connected to the output of said differential amplifier through a summation point to detect a peak value of said synchronization pulses to generate a voltage signal representative of the detected peak value;
inverter means for inverting the polarity of said voltage signal and supplying its output to said second input terminal of said differential amplifier as said feedback signal, whereby a negative feedback loop is formed to control the level of said feedback signal at a constant level;
comparator means having a first input terminal connected to be responsive to said composite video signal and a second input terminal connected to be responsive to said feedback signal to provide a second output signal to said peak detector means through said summation point to produce an offset voltage thereat when the voltage at the first input terminal of said comparator is reduced to a level below the voltage at the second input terminal; and biasing means for biasing the first input terminal of said comparator means to a certain potential level with respect to the first input terminal of said differential amplifier.

3. A noise cancellation circuit as claimed in claim 2, wherein said peak detector means has a charging time constant value sufficient to respond to said synchronization pulse and insufficient to respond to a spike pulse narrower in width than the width of the synchronization pulse and a discharging time constant value sufficient to maintain the detected peak value for an interval between successive synchronization pulses.

4. A noise cancellation circuit as claimed in claim 1, 2 or 3, wherein said differential amplifier means comprises an operational amplifier.

5. A noise cancellation circuit as claimed in claim 2, wherein the output circuit of said differential amplifier means includes a first and a second resistor connected in series to define said summation point therebetween, the output circuit of said comparator means being connected to the output circuit of said differential amplifier means through said first and second resistors.

6. A noise cancellation circuit as claimed in claim 5, wherein the junction between the output circuits of said differential amplifier means and said comparator means is connected to a synchronization separator to supply said first output signal thereto through said first and second resistors.

7. A noise cancellation circuit as claimed in claim 2, further comprising a DC decoupling capacitor for removing a DC component of said composite video signal, and means for applying a DC potential to said first input terminal of said differential amplifier means so that the voltage thereat has an average value which is equal to said DC potential.

8. A noise cancellation circuit as claimed in claim 7, wherein the voltage level at the second input terminal of said comparator means is below the combined voltage of said certain potential level and said DC potential.

9. A noise cancellation circuit as claimed in claim 5, wherein the values of said first and second resistors are selected so that when said comparator means produces said offset voltage the voltage level at the second input terminal of said comparator means is below the combined voltage of said certain potential level and a DC potential applied to said first input terminal of said differential amplifier means.

* * * * *